(12) United States Patent
Wang et al.

(10) Patent No.: US 9,266,781 B2
(45) Date of Patent: Feb. 23, 2016

(54) NANO COMPLEX OXIDE DOPED DIELECTRIC CERAMIC MATERIAL, PREPARATION METHOD THEREOF AND MULTILAYER CERAMIC CAPACITORS MADE FROM THE SAME

(71) Applicant: Tsinghua University, Beijing (CN)

(72) Inventors: Xiaohui Wang, Beijing (CN); Zhibin Tian, Beijing (CN); Tian Wang, Beijing (CN); Longtu Li, Beijing (CN)

(73) Assignee: Tsinghua University, Beijing (CN)

( * ) Notice: Subject to any disclaimer, the term of this patent is extended or adjusted under 35 U.S.C. 154(b) by 68 days.

(21) Appl. No.: 14/106,168

(22) Filed: Dec. 13, 2013

(65) Prior Publication Data

US 2014/0102619 A1     Apr. 17, 2014

Related U.S. Application Data

(62) Division of application No. 12/277,994, filed on Nov. 25, 2008, now abandoned.

(30) Foreign Application Priority Data

Nov. 27, 2007 (CN) ........................... 2007 1 0178132
Nov. 27, 2007 (CN) ........................... 2007 1 0178134

(51) Int. Cl.
*C03B 29/00* (2006.01)
*C04B 35/00* (2006.01)
(Continued)

(52) U.S. Cl.
CPC ............... *C04B 35/46* (2013.01); *B32B 18/00* (2013.01); *B82Y 30/00* (2013.01); *C01G 23/006* (2013.01);
(Continued)

(58) Field of Classification Search
CPC .. C04B 35/622; C04B 35/628; C04B 35/468; C04B 35/46; C04B 35/6261; C04B 35/62625; C04B 35/62635; C04B 35/6264; C04B 35/62805; C04B 35/62886; C04B 37/00; C04B 37/001; C04B 37/006; C04B 2235/5445; C04B 2235/5454; C04B 2237/346; C04B 35/64; H01G 4/33; H01G 4/1218; B32B 18/00
See application file for complete search history.

(56) References Cited

U.S. PATENT DOCUMENTS 5,335,139 A * 8/1994 Nomura ............... H01G 4/1227
                                                      252/519.1
5,403,797 A    4/1995 Ohtani et al.
(Continued)

FOREIGN PATENT DOCUMENTS

DE     19918091 A1    10/2000
JP     63-103861 A    5/1988

OTHER PUBLICATIONS

Tian, Z. et al., "Preparation of Nano BaTiO$_3$-Based Ceramics for Multilayer Ceramic Capacitor Application by Chemical Coating Method." *J. Am. Ceram. Soc.* 92[4], 830-833 (2009).
(Continued)

*Primary Examiner* — Alex Efta
(74) *Attorney, Agent, or Firm* — Drinker Biddle & Reath LLP

(57) ABSTRACT

The present invention provides a nano complex oxide doped dielectric ceramic material used for a multilayer ceramic capacitor using a base metal as a material of internal electrodes. The doped dielectric ceramic material comprises barium titanate and a nano complex oxide dopant, wherein the molar ratio of the barium titanate to the nano complex oxide dopant is in the range of (90 to 98):(2 to 10), the average particle size of the barium titanate is 50 to 300 nm and the nano complex oxide dopant has the following formula (1): wA+xB+yC+zD. The present invention also provides processes for preparing the nano complex oxide doped dielectric ceramic material and ultrafine-grained and temperature-stable multilayer ceramic capacitors using the nano complex oxide doped dielectric ceramic material as a material of dielectric layers.

14 Claims, 4 Drawing Sheets

(51) Int. Cl.
*C04B 35/46* (2006.01)
*C04B 37/00* (2006.01)
*B32B 18/00* (2006.01)
*C04B 35/626* (2006.01)
*C04B 35/628* (2006.01)
*B82Y 30/00* (2011.01)
*C01G 23/00* (2006.01)
*C04B 35/624* (2006.01)
*C04B 35/632* (2006.01)
*C04B 35/638* (2006.01)
*H01G 4/30* (2006.01)
*C04B 35/462* (2006.01)
*H01G 4/33* (2006.01)
*H01G 4/12* (2006.01)
*C04B 35/468* (2006.01)

(52) U.S. Cl.
CPC ......... *C04B 35/462* (2013.01); *C04B 35/4682* (2013.01); *C04B 35/624* (2013.01); *C04B 35/628* (2013.01); *C04B 35/6261* (2013.01); *C04B 35/6281* (2013.01); *C04B 35/62625* (2013.01); *C04B 35/62635* (2013.01); *C04B 35/62805* (2013.01); *C04B 35/62807* (2013.01); *C04B 35/62815* (2013.01); *C04B 35/62886* (2013.01); *C04B 35/62897* (2013.01); *C04B 35/632* (2013.01); *C04B 35/638* (2013.01); *C04B 37/001* (2013.01); *C04B 37/006* (2013.01); *H01G 4/1227* (2013.01); *H01G 4/30* (2013.01); *C01P 2002/52* (2013.01); *C01P 2004/04* (2013.01); *C01P 2004/62* (2013.01); *C01P 2004/64* (2013.01); *C01P 2006/32* (2013.01); *C01P 2006/40* (2013.01); *C04B 35/468* (2013.01); *C04B 2235/3206* (2013.01); *C04B 2235/3208* (2013.01); *C04B 2235/3225* (2013.01); *C04B 2235/3229* (2013.01); *C04B 2235/3236* (2013.01); *C04B 2235/3262* (2013.01); *C04B 2235/3418* (2013.01); *C04B 2235/441* (2013.01); *C04B 2235/443* (2013.01); *C04B 2235/449* (2013.01); *C04B 2235/5445* (2013.01); *C04B 2235/5454* (2013.01); *C04B 2235/6025* (2013.01); *C04B 2235/656* (2013.01); *C04B 2235/6567* (2013.01); *C04B 2235/6582* (2013.01); *C04B 2235/6584* (2013.01); *C04B 2235/663* (2013.01); *C04B 2235/785* (2013.01); *C04B 2237/346* (2013.01); *H01G 4/1218* (2013.01); *H01G 4/33* (2013.01)

(56) References Cited

U.S. PATENT DOCUMENTS

| | | |
|---|---|---|
| 5,668,694 A | 9/1997 | Sato et al. |
| 6,185,087 B1 | 2/2001 | Park et al. |
| 6,721,167 B2 | 4/2004 | Chazono et al. |
| 6,727,200 B2 | 4/2004 | Maher et al. |
| 6,828,266 B1 | 12/2004 | Park et al. |
| 6,891,329 B2 | 5/2005 | Nagano et al. |
| 7,161,795 B1 | 1/2007 | Megherhi et al. |
| 7,230,817 B2 | 6/2007 | Megherhi et al. |
| 7,727,922 B2 | 6/2010 | Koebrugge et al. |
| 7,795,663 B2 | 9/2010 | Suh et al. |
| 7,858,548 B2 | 12/2010 | Symes, Jr. et al. |
| 8,114,801 B2 | 2/2012 | Symes, Jr. et al. |
| 2002/0016249 A1 | 2/2002 | Saito et al. |
| 2003/0113446 A1* | 6/2003 | Hasegawa ........... C01G 23/002 427/212 |
| 2003/0147198 A1 | 8/2003 | Konaka et al. |
| 2004/0028601 A1 | 2/2004 | Torii et al. |
| 2004/0138050 A1* | 7/2004 | Wang ................. B32B 18/00 501/138 |
| 2004/0229746 A1 | 11/2004 | Park et al. |
| 2007/0172592 A1 | 7/2007 | Trolier-McKinstry et al. |
| 2007/0281160 A1* | 12/2007 | Krishna ............... B01D 69/02 428/403 |
| 2008/0089008 A1 | 4/2008 | Nishikawa et al. |
| 2009/0135546 A1 | 5/2009 | Wang et al. |

OTHER PUBLICATIONS

Tian, Z. et al., "Fabrication of $BaTiO_3$-Based Dielectrics for Ultrathin-Layer Multilayer Ceramic Capacitor Application by a Modified Coating Approach." *Japanese Journal of Applied Physics* 50, 025801-1-025801-4 (2011).

\* cited by examiner

NANO COMPLEX OXIDE DOPED DIELECTRIC CERAMIC MATERIAL, PREPARATION METHOD THEREOF AND MULTILAYER CERAMIC CAPACITORS MADE FROM THE SAME

CROSS REFERENCE TO RELATED APPLICATIONS

This application is a divisional application of U.S. application Ser. No. 12/277,994, filed Nov. 25, 2008, which claims benefit to Chinese application nos. 200710178134.2 and 200710178132.3, both of which were filed on Nov. 27, 2007.

TECHNICAL FIELD OF THE INVENTION

The present invention relates to a dielectric ceramic material. Particularly, the present invention relates to a nano complex oxide doped dielectric ceramic material used for an ultrafine grained and temperature-stable multilayer ceramic capacitors employing a base metal such as nickel as the material of internal electrodes.

TECHNICAL BACKGROUND

With rapid development of various types of electronic devices, there is a tendency that these devices and products are smaller in size and larger in capacitance. The component parts for these devices are also increasingly produced in compact and lightweight design. The means for mounting the electronic components are also changing to surface mounting technology (SMT). Small components such as capacitor and resistor are called "chip components".

Multilayer Ceramic Capacitor (MLCC) is a widely used typical chip component. It is generally fabricated by forming alternating layers of an internal electrode forming paste and a dielectric layer-forming paste. Such layers are typically formed by sheeting, printing or similar techniques, followed by concurrent firing.

The Electronic Industry Association (EIA) prescribes a standard for temperature coefficient of capacitance (TCC) for a type of MLCC known as the X5R/X7R capacitors. The X5R characteristic requires that with reference to the capacitance at 25° C., the change of the capacitance should be within ±15% over the temperature range from −55° C. to 85° C., and the dielectric loss is no more than 2.5%. The X7R characteristic requires that with reference to the capacitance at 25° C., the change of the capacitance be within ±15% over the temperature range from −55° C. to 125° C., and the dielectric loss is no more than 2.5%.

When MLCC based on $BaTiO_3$ were sintered in air at high temperatures, it is required to use noble metals (e.g., palladium, platinum, etc.) as internal electrodes, which do not melt and do not oxidize even when being fired in an atmosphere with a high partial pressure of oxygen. However, use of such noble metals becomes a barrier to cut down the production cost of multilayer ceramic capacitors. For example, the cost of internal electrodes occupies about 30 to 70% of the production cost of multilayer ceramic capacitors. For the reasons mentioned above, it is preferred to use a base metal such as Ni, Cu as the material of internal electrodes. However, if such base metals are used as a material for internal electrodes and fired in the conventional firing conditions of the dielectric ceramic materials, they would be oxidized easily and lose functions as the internal electrodes. Thus, in order to use such a base metal as a material for internal electrodes of multilayer ceramic capacitors, it is required to dope some elements such as Mn or Mg to avoid semiconductorization of $BaTiO_3$ based dielectric material, and required to be fired in a neutral or reducing atmosphere with a low partial pressure of oxygen, so that to ensure sufficient insulation resistance and good dielectric properties.

To meet the requirements above, it has been proposed some non-reducible dielectric ceramic materials. For example, JP-A-63-103861 discloses a composition of $BaTiO_3$—MnO—MgO-Rare earth element system. However, this dielectric ceramic composition is of no practical use since its insulation resistance and temperature coefficient of capacitor are affected by the grain size of the main component $BaTiO_3$, thus making it difficult to control the composition to obtain stable dielectric properties.

In US 20040229746A1, a composition of $BaTiO_3$—$Mn_3O_4$—$Y_2O_3$—$Ho_2O_3$—$CaCO_3$—$SiO_2$—$B_2O_3$—$Al_2O_3$—MgO—CaO is disclosed. Although it can be sintered at 1200° C. to 1300° C., the grain size is larger than 500 nm, which is not in favor of reducing the thickness of the dielectric layers.

In DE-19918091A1, a composition of $BaTiO_3$—MgO—MnO—$V_2O_5$—$Al_2O_3$—$Ho_2O_3$—$BaCO_3$—SrO—CaO—CoO—$ZrO_2$ is disclosed. It satisfies the X7R characteristics: the dielectric constant can be adjusted at 2000-4000. However, the sintering temperature for this system is too high, over 1300° C. and the TCC at −55° C. or 125° C. is near −15%. Thus, the composition is not suitable for industrial production.

The development of electronic equipments towards miniaturization and high performance requires smaller multilayer ceramic capacitors (MLCCs) for industry application. The thickness of dielectric layer becomes thinner and thinner, from 10 μm to 5 μm, 2 μm, 1 μm, and even below 1 μm. In order to ensure the reliability of MLCCs, the corresponding grain size should be reduced from 1000 nm to 500 nm, 200 nm, 100 nm, and even smaller. Meanwhile, the grain size should be very uniform. However, the reducing of the grain size generally induces the decreasing of the dielectric constant. In U.S. 62/709,906B1, when the grain size of the ceramic reduces to 100 nm to 200 nm, the dielectric constant is 1600 to 1800, lower than 2000.

Therefore, the problem that this invention intends to solve is to control the composition, microstructure and sintering process of the dielectric ceramic material to obtain a dielectric material suitable to be used for an ultrafine grained and temperature-stable multilayer ceramic capacitor.

SUMMARY OF THE INVENTION

The present invention provides a nano complex oxide doped dielectric ceramic material used for a multilayer ceramic capacitor using a base metal as a material of internal electrodes. The doped dielectric ceramic material comprises barium titanate and a nano complex oxide dopant, wherein the molar ratio of the barium titanate to the nano complex oxide dopant is in the range of (90 to 98):(2 to 10), the average particle size of the barium titanate is 50 to 300 nm and the nano complex oxide dopant has the following formula (1):

$$wA + xB + yC + zD \quad (1)$$

wherein, A represents one or more selected from the group consisting of $CaTiO_3$, CaO, BaO, SrO and MgO; B represents one or more selected from the group consisting of $MnO_2$, $CO_2O_3$, $CO_3O_4$, $Fe_2O_3$ and $Y_2O_3$; C represents one or more selected from the group consisting of $SiO_2$, $B_2O_3$ and $Li_2O$; D represents an oxide of Re, wherein Re is one or more rare-earth elements selected from the group consisting of La, Ce, Pr, Nd, Sm, Eu, Gd, Tb, Dy, Ho, Er, Tm, Yb and Lu; w, x, y and z are molar percentages of the oxides with respect to the $BaTiO_3$, wherein w is 0.01 to 2%, x is 0.01 to 3%, y is 0.1 to 6%, and z is 0 to 4%.

The dielectric ceramic material of the present invention can be prepared by a chemical coating process, wherein the doped elements are coated on the surface of the barium titanate particles through a co-precipitation process.

The chemical coating process comprises the following steps:

1. Adding barium titanate powders into a solvent selected from de-ionized water, ethanol, propanol, isopropanol or the like and milling to obtain a well dispersed suspension of barium titanate, wherein the average particle size of the barium titanate powders is 50 to 300 nm;

2. Dissolving acetates or nitrates of the metal elements corresponding to the oxides in the complex oxide "wA+xB+yC+zD" according to the molar ratios of that w is 0.01 to 2%, x is 0.01 to 3%, y is 0.1 to 6%, and z is 0 to 4% in de-ionized water to obtain a transparent solution S1;

3. Mixing alkoxide of silicon, ethanol, acetic acid and de-ionized water with continuous stirring to get a transparent and stable solution S2;

4. Adding solution S1 and solution S2 into the suspension of barium titanate with stirring to obtain an even slurry, wherein the volume ratios of the solutions and the suspension are set as $S1:S2:BaTiO_3$ suspension=(1 to 8):(1 to 4):(10 to 50);

5. Adding ammonia water into the slurry obtained in step 4 to adjust the pH value to 6 to 11 so that the doping elements are uniformly coated onto the barium titanate particles through a co-precipitation process;

6. Drying the slurry obtained in step 5 at 80° C. to 120° C. to get dried powders.

7. Calcining the dried powders obtained in step 6 at 300 to 600° C. for 1 to 6 hours in air, followed by crushing and sieving to obtain a nano complex oxide doped dielectric ceramic material, wherein the thickness of the coating layer formed by the doping elements is 1 to 20 nm.

The dielectric ceramic material of the present invention can also be prepared by the following process, wherein a nano complex oxide dopant is prepared by a sol-gel method firstly with a particle size of 10 to 80 nm and then powders of $BaTiO_3$ with an average particle size of 50 to 300 nm and the nano complex oxide dopant are mixed and milled to obtain a nano doped dielectric ceramic material.

The nano complex oxide dopant is prepared by a sol-gel method as follows:

1. Dissolving acetates or nitrates of the metal elements corresponding to the oxides in the complex oxide "wA+xB+yC+zD" according to the mole ratios of that w is 0.01 to 2%, x is 0.01 to 3%, y is 0.1 to 6%, and z is 0 to 4% in de-ionized water, and then adding polyethylene glycol (PEG) into the solution with continuous stirring till a transparent solution S1 is obtained, wherein the weight ratio of PEG and the metal acetates or nitrates is set as PEG:acetates or nitrates=(0.1 to 3):1;

2. Mixing alkoxide of silicon, ethanol, acetic acid and de-ionized water with continuous stirring to get a transparent and stable solution S2;

3. Adding solution S1 into solution S2 with continuous stirring to obtain a transparent precursor solution (sol), wherein the volume ratio of solution S1 to solution S2 is set as S1:S2=(0.5 to 20):1;

4. Drying the sol obtained in step 3 at 80 to 160° C. for 6 to 48 hours to get a xerogel;

5. Calcining the xerogel at 400 to 1000° C. for 1 to 10 hours in air, followed by crushing and sieving to obtain a nano complex oxide dopant with an average particle size of 5 to 100 nm.

The nano complex oxide dopant is mixed with powders of $BaTiO_3$ having an average particle size in the range of 50 to 300 nm by a molar ratio of $BaTiO_3$ to the complex oxide as (90 to 98):(2 to 10), milled for 6 to 48 hours and then dried to obtain a nano complex oxide doped dielectric ceramic material.

The present invention also provides a base-metal internal electrode multilayer ceramic capacitor using the above-described nano complex oxide doped dielectric ceramic material as the material of dielectric layers. The capacitor is an ultrafine grained and temperature-stable capacitor satisfying X5R or X7R standards, and the average grain size of the dielectric layers is less than 300 nm, preferably less than 200 nm.

The multilayer ceramic capacitor of the present invention is prepared as follows:

The nano complex oxide doped dielectric ceramic material is mixed with suitable organic solvent, binder, dispersant and plasticizer to provide a ceramic slurry; a dielectric layer is formed by a tape-casting method using the slurry with the thickness of the dielectric layer of below 10 µm; multiple of the dielectric layers and base-metal internal electrode layers are alternately stacked to prepare a stack body; the binder is removed after the stacked body is formed; the binder-removed stack body is then sintered under a reducing atmosphere at a temperature of from 950° C. to 1250° C.; the stack body is then reoxidized in a weak oxidation atmosphere at 800° C. to 1100° C. to enhance insulation resistance of the dielectric; and then the stack body is cooled down to room temperature and Cu or Ag terminal electrode is mounted to obtain an ultrafine-grained and temperature-stable multilayer ceramic capacitor having base-metal internal electrodes.

The sintering process in the above method can be carried out by two ways: (a) two-step sintering, the stack body is held at a relative high temperature $T_1$ for 0 to 30 min, then the temperature is decreased quickly to a relative low temperature $T_2$ holding for 2 to 10 h to complete the densification, wherein 950° C.$\leq T_2 < T_1 \leq$1250° C.; (b) normal sintering, the stack body is held at 1050° C. to 1250° C. for 2 to 10 h to complete the densification.

BRIEF DESCRIPTION OF THE DRAWINGS

Embodiments of the invention are described with reference to the accompanying drawings.

BEST MODE FOR CARRYING OUT THE INVENTION

Figure 1:
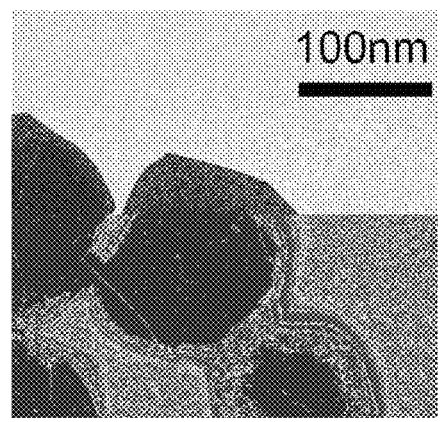
FIG. 1 illustrates a transmission electron micrograph of the chemical coating powders in example 1.

The present invention provides a nano complex oxide doped dielectric ceramic material used for an ultrafine grained and temperature-stable multilayer ceramic capacitor, which uses a base metal as a material of internal electrodes. The doped dielectric ceramic material comprises barium titanate and nano dopant, wherein the molar ratio of the barium titanate to the nano dopant is preferably in the range of (90 to 97):(3 to 10) and the average particle size of the barium titanate is preferable 100 to 200 nm.

The dielectric ceramic material of the present invention can be prepared by a chemical coating process, wherein the doped elements are coated on the surface of the barium titanate particles through a co-precipitation process. In step 3 of the chemical coating process, the volume ratios of the liquids are set as alkoxide of silicon:ethanol:acetic acid:de-ionized water=1:(1 to 15):(1 to 8):(5 to 40) and the alkoxide of silicon is preferably ethyl orthosilicate or butyl orthosilicate.

The dielectric ceramic material of the present invention can also be prepared by a process, wherein the nano complex oxide dopant is prepared by a sol-gel method firstly with a particle size of 10 to 80 nm and then powders of $BaTiO_3$ and the nano complex oxide dopant are mixed and milled to obtain a nano doped dielectric ceramic material. In step 2 of the sol-gel method, the volume ratios of the liquids are set as alkoxide of silicon:ethanol:acetic acid:de-ionized water=1:(1 to 15):(1 to 8):(5 to 40) and the alkoxide of silicon is preferably ethyl orthosilicate or butyl orthosilicate and the obtained nano complex oxide dopant preferably has an average particle size of 10 to 80 nm.

The ultrafine-grained and temperature-stable multilayer ceramic capacitor having base-metal internal electrodes is preferably manufactured through the following process:

1. The nano complex oxide doped dielectric ceramic material is mixed with an organic solvent, a binder, a dispersant and a plasticizer to provide a ceramic slurry, wherein the weight ratios of the above materials are set as ceramic powder:organic solvent:binder:dispersant:plasticizer=(10 to 60):(3 to 15):(1 to 5):(1 to 10):(1 to 3);

2. A dielectric layer is formed by tape-casting method from the slurry with the thickness of the dielectric layer of below 10 μm;

3. Multiple of the dielectric layers and base-metal internal electrode layers are alternately stacked to prepare a stack body;

4. The stack body fabricated in step 3 is subjected to a binder removing process at a temperature in the range of from 280 to 350° C. for 10 to 20 hours in air or under nitrogen atmosphere;

5. The binder-removed stack body is then sintered under a reducing atmosphere having oxygen partial pressure in the order of $10^{-6}$ to $10^{-12}$ atm and a volume ratio of $N_2$ to $H_2$ in the range of 40:1 to 15:1 through a two-step sintering or a normal sintering at 950 to 1250° C.;

6. The sintered stack body is reoxidized in a weak oxidation atmosphere with oxygen partial pressure of $10^{-5}$ to $10^{-2}$ atm at 800° C. to 1100° C. for 2 to 10 hours;

7. The sintered stack body is cooled down to room temperature;

8. Cu or Ag terminal electrode is mounted and heated at 600° C. to 800° C. under $N_2$ atmosphere to obtain an ultrafine-grained and temperature-stable multilayer ceramic capacitor having base-metal internal electrodes.

In the above method the organic solvent is preferably toluene or ethanol, the binder is preferably polyvinyl-butyral, the dispersant is preferably a phosphate and the plasticizer is preferably di-n-butyl phthalate or di-sec-octyl phthalate.

Hereinbelow, specific examples are given to further describe the present invention. However, the scope of the invention is not limited by the examples.

Example 1

Preparation of a Nano Complex Oxide Doped Dielectric Ceramic Material Through a Chemical Coating Process $BaTiO_3$ powders (with an average particle size of 120 nm) were ball-milled in ethanol for 12 hours to get a $BaTiO_3$ slurry A; Nitrates corresponding to the oxides in the nano complex oxide were weighed according to molar ratios of Y:Ce:Mn:Mg:Si:Ca=4:1:3:12:5:3 and dissolved in deionized water to obtain a clear solution B; $Si(OEt)_4$, ethanol, acetic acid and deionized water were mixed by volume ratios of $Si(OEt)_4$:ethanol:acetic acid:deionized water=1:10:6:20 to obtain a clear and stable solution C; solution B and solution C were dropwise added to the $BaTiO_3$ slurry A by volume ratios of A:B:C=5:2:1; Ammonia water was added to make the pH to 8 so that the doping elements were coated on to the surface of the $BaTiO_3$ particles through a co-precipitation process; the obtained slurry was dried and then was sintered at 500° C. for 2 hours, followed by sieving to obtain a nano complex oxide doped dielectric ceramic material with the molar ratio of $BaTiO_3$ to the complex oxide being 96:4. FIG. 1 illustrates the transmission electron micrograph of the doped dielectric ceramic material in example 1. It can be seen from FIG. 1 that the thickness of the coating layer of the doping elements was 1 to 20 nm.

Example 2

Nano complex oxide doped dielectric ceramic materials were prepared by the same way as described in example 1 except that the average particle sizes of the $BaTiO_3$ powders were 120 nm, 135 nm and 150 nm, respectively, the composition of the nano complex oxide dopant in the coating layer (CL) was Y:Ce:Mn:Mg:Si:Ca=3:2:3:12:4:2 (molar ratio), and the molar ratio of the BaTiO3 to the nano complex oxide was 95:5. Thus samples 1 to 3 of the nano complex oxide doped dielectric ceramic materials were obtained, as shown in Table 1.

Tests of the dielectric properties of samples 1 to 3.

Figure 2:
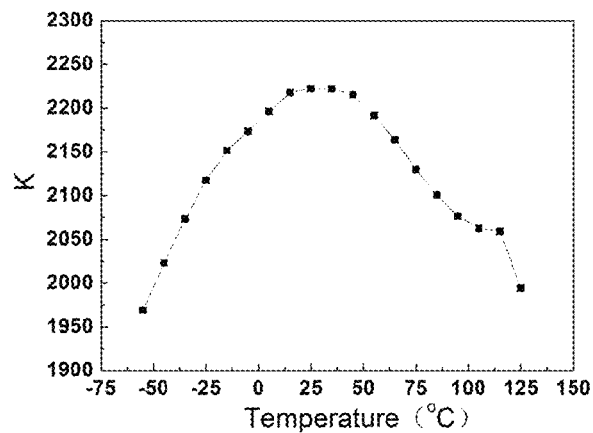
FIG. 2 illustrates a graph of the dielectric constant as a function of temperature of sample 1 in example 2.
Figure 3:
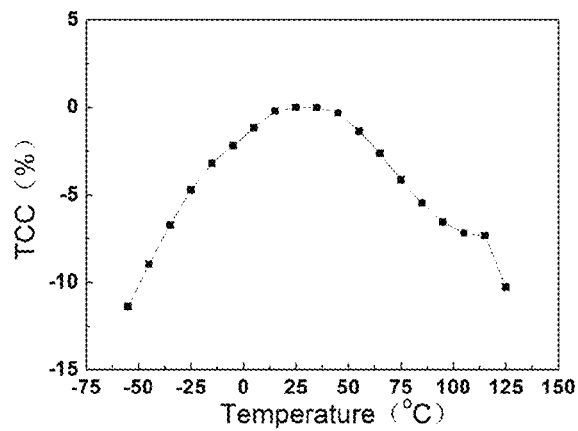
FIG. 3 illustrates a graph of the TCC (Temperature Coefficient of Capacitance) as a function of temperature of sample 1 in example 2.
Figure 4:
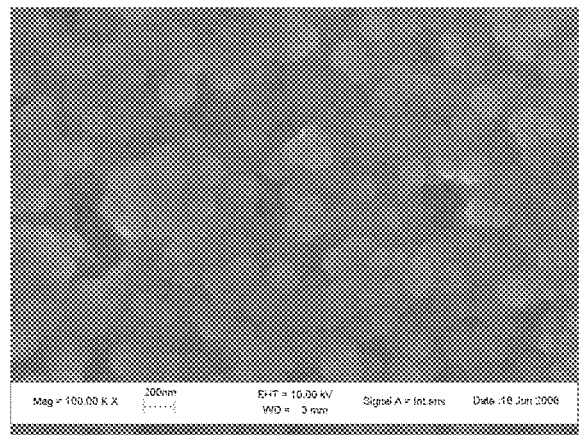
FIG. 4 illustrates the microstructure of the surface of sample 1 in example 2 after sintering.

Each of samples 1 to 3 was pressed into a pellet with a diameter of 10 mm and sintered in a reducing atmosphere at 1200° C. for 2 h ($N_2$:$H_2$=30:1), followed by reoxidizing in a weak oxidation atmosphere at 1050° C. for 2 h. Silver electrodes were deposited onto both the main sides of the pellet to conduct dielectric measurement. The dielectric properties and grain size of these samples are listed in Table 1. FIG. 2 illustrates a graph of the dielectric constant as a function of temperature of sample 1 in example 2. FIG. 3 illustrates a graph of the TCC as a function of temperature of sample 1 in example 2. FIG. 4 illustrates the microstructure of sample 1 after sintering. It can be seen that the grain sizes of the doped ceramic materials were uniform and the average grain size is 150 nm.

TABLE 1

| Sample | Average Particle size of $BaTiO_3$(nm) | Sintering condition | Dielectric constant ∈ (25° C.) | Average grain size of the sintered sample(nm) | Specs |
|---|---|---|---|---|---|
| 1 | 120 | 1200° C.-2 h | 2222 | 150 | X7R |
| 2 | 135 | 1200° C.-2 h | 2206 | 172 | X7R |
| 3 | 150 | 1200° C.-2 h | 2147 | 180 | X7R |

Example 3

Nano complex oxide doped dielectric ceramic materials were prepared by the same way as described in example 1 except that the average particle sizes of the barium titanate, the mole ratios of barium titanante to the nano complex oxide and the compositions of the nano complex oxides in the coating layer (CL) were different, as listed in Table 2 and Table 3. Thus samples 4 to 9 of nano complex oxide doped dielectric ceramic materials were obtained.

Tests of the dielectric properties of samples 4 to 9.

Each of samples 4 to 9 was pressed into a pellet with a diameter of 10 mm and sintered in a reducing atmosphere at 1150° C. to 1250° C. for 2 h ($N_2H_2$=35:1), followed by reoxidizing in a weak oxidation atmosphere at 1050° C. for 3 h. Silver electrodes were deposited onto both the main sides of the pellet to conduct dielectric measurement. The dielectric properties and the average grain sizes of these samples are listed in Table 3.

TABLE 2

| Nano complex oxide in the coating layer | Composition (molar ratio) |
|---|---|
| CL1 | Y:Mn:Mg:Si:Ca = 4:3:12:4:1 |
| CL2 | Y:Ce:Mn:Mg:Si:Ca = 5:1:3:10:5:2 |
| CL3 | Dy:Sm:Mn:Mg:Si:Ba = 5:1:4:12:5:1 |
| CL4 | Dy:Ce:Mn:Mg:Si:Ca = 3:1:4:11:6:2 |

TABLE 3

| Sample | Average Particle size of $BaTiO_3$ (nm) | Coating layer | Molar ratio of $BaTiO_3$:CL | Sintering condition | Dielectric constant $\in$ (25° C.) | Average grain size of the sintered sample (nm) | Specs |
|---|---|---|---|---|---|---|---|
| 4 | 110 | CL1 | 97:3 | 1200° C.-2 h | 2056 | 153 | X7R |
| 5 | 110 | CL2 | 96:4 | 1170° C.-3 h | 2139 | 157 | X7R |
| 6 | 120 | CL3 | 96:4 | 1200° C.-2 h | 2364 | 190 | X7R |
| 7 | 135 | CL1 | 94:6 | 1200° C.-2 h | 2609 | 162 | X5R |
| 8 | 150 | CL4 | 95:5 | 1180° C.-3 h | 2144 | 185 | X7R |
| 9 | 150 | CL2 | 97:3 | 1230° C.-2 h | 2576 | 193 | X5R |

Example 4

Nano complex oxide doped dielectric ceramic materials were prepared by the same way as described in example 1 except that the average particle sizes of the barium titanate powders and the mole ratios of barium titanate to the nano complex oxide in the coating layer (CL2 to CL4) were different, as shown in Table 4. Thus samples 10 to 13 of nano complex oxide doped dielectric ceramic materials were obtained.

Tests of the dielectric properties of samples 10 to 13.

Each of samples 10 to 13 was pressed into a pellet with a diameter of 10 mm and sintered in a reducing atmosphere by a two-step sintering method, wherein the temperature was increased to 1200° C. to 1250° C. and kept for 0 to 10 min, and then quickly decreased to 950° C. to 1100° C. and kept for 2 to 8 h, followed by reoxidizing in a weak oxidation atmosphere at 900° C. to 1000° C. for 3 h. Silver electrodes were deposited onto both the main sides of the pellet to conduct dielectric measurement. The dielectric properties and the average grain sizes of these samples are listed in Table 4.

Example 5

Preparation of a Nano Complex Oxide Dopant Through a Sol-Gel Process

Figure 5:
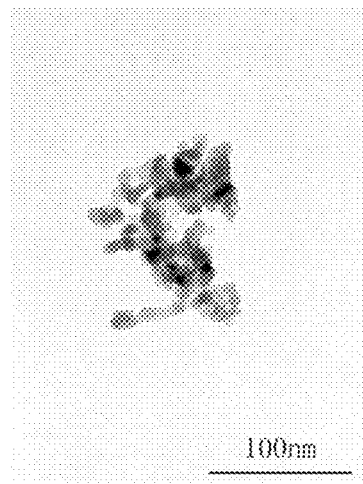
FIG. 5 illustrates a transmission electron micrograph of the synthesized nano dopant in example 5.

Nitrates corresponding to the oxides in the nano complex oxide dopant were weighed according to the molar ratios of Y:Mn:Mg:Si:Ca=5:3:12:7:1 and dissolved in deionized water, polyethylene glycol (PEG) was added with the weight ratio of the mixed nitrates to PEG being 0.5:1; The mixture was stirred continuously to obtain a clear solution A'; Si(OEt)$_4$, ethanol, acetic acid and deionized water were mixed by volume ratios of Si(OEt)$_4$:ethanol:acetic acid:deionized water=1:12:6:30 to obtain a clear solution B'; Solution A' and solution B' were mixed together slowly with a volume ratio of A':B'=5:1 to give a precursor solution C'. A xerogel was obtained after drying the precursor solution C' at 120° C. for 24 h, and then at 140° C. for 6 h. A nano dopant (ND1) was produced by calcining the xerogel at 800° C. for 3 h, followed by crushing and sieving. FIG. 5 illustrates the transmission electron micrograph of the nano dopant (ND1). It can be seen that the average particle size of the nano dopant is less than 50 nm.

Example 6

$BaTiO_3$ powders (with an average grain size of 110 nm, 125 nm, 150 nm, respectively) and the nano dopant (ND1) were mixed with the mole ratio of $BaTiO_3$ to the nano dopant as 93:7. The mixture was ground for 20 hours by a wet method in a ball mill, and then dried at 110° C. for 8 hours to obtain nano complex oxide doped dielectric ceramic materials, i.e, samples 1' to 3'.

Tests of the dielectric properties of samples 1' to 3'.

Each of samples 1' to 3' was pressed into a pellet with a diameter of 10 mm and sintered in a reducing atmosphere at

TABLE 4

| Sample | Average particle size of $BaTiO_3$ (nm) | Coating layer | Molar ratio of $BaTiO_3$:CL | Sintering condition | Dielectric constant $\in$ (25° C.) | Average grain size of the sintered sample (nm) | Specs |
|---|---|---|---|---|---|---|---|
| 10 | 110 | CL2 | 93:7 | 1220° C.-0 min, 1080° C.-3 h | 2105 | 145 | X7R |
| 11 | 120 | CL4 | 95:5 | 1180° C.-0 min, 1050° C.-3 h | 2231 | 169 | X7R |
| 12 | 135 | CL3 | 96:4 | 1220° C.-0 min, 1080° C.-3 h | 2190 | 170 | X7R |
| 13 | 110 | CL2 | 97:3 | 1220° C.-10 min, 950° C.-8 h | 2425 | 149 | X5R |

Figure 6:
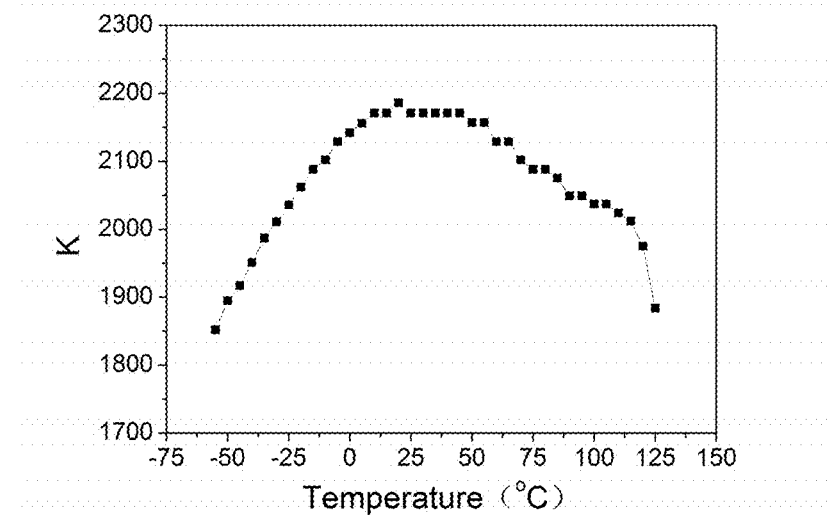
FIG. 6 illustrates a graph of the dielectric constant as a function of temperature of sample 1' in example 6.
Figure 7:
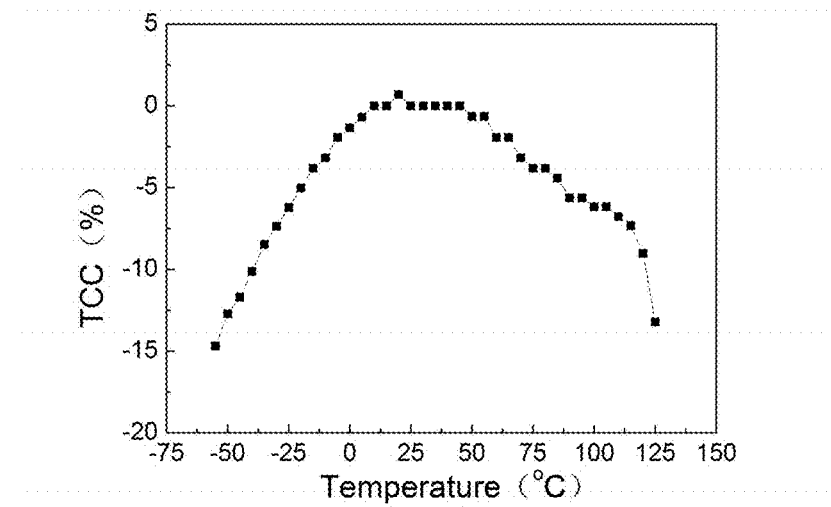
FIG. 7 illustrates a graph of the TCC as a function of temperature of sample 1' in example 6.
Figure 8:
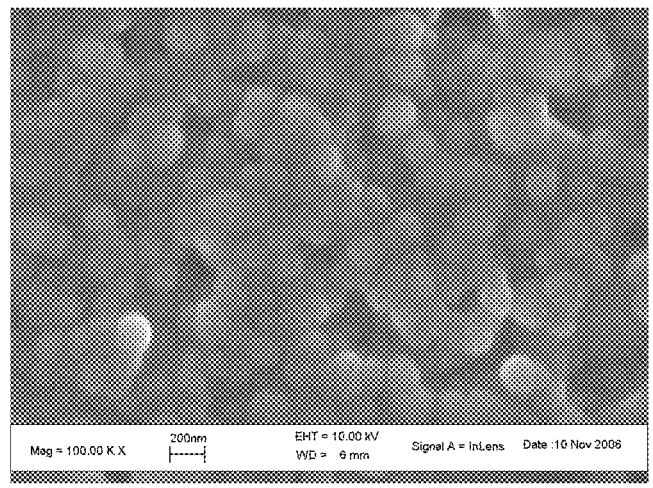
FIG. 8 illustrates the microstructure of the surface of sample 1' in example 6 after sintering.

1200° C. for 2 h ($N_2:H_2=20:1$), followed by reoxidizing in a weak oxidation atmosphere at 1050° C. for 2 h. Silver electrodes were deposited onto both the main sides of the pellet to conduct dielectric measurement. The dielectric properties and grain size of these samples are listed in Table 5. FIG. 6 illustrates a graph of the dielectric constant as a function of temperature of sample 1' in example 6. FIG. 7 illustrates a graph of the TCC as a function of temperature of sample 1' in example 6. FIG. 8 illustrates the microstructure of the surface of sample 1' in example 6 after sintering.

TABLE 5

| Sample | Average particle size of $BaTiO_3$ (nm) | Sintering condition | Dielectric constant ∈ (25° C.) | Average grain size of the sintered samples (nm) | Specs |
|---|---|---|---|---|---|
| 1' | 110 | 1200° C.-2 h | 2171 | 150 | X7R |
| 2' | 125 | 1200° C.-2 h | 2091 | 164 | X7R |
| 3' | 150 | 1200° C.-2 h | 2099 | 176 | X7R |

Example 7

Nano complex oxide dopants ND2 to ND7 were prepared by the same way as described in example 5 except that the compositions of the dopants were different as shown in Table 6. The molar ratios of the nano dopant relative to the barium titanate were set in the range as shown in Table 7. Powders of barium titanate and the nano dopant were mixed and ground for 20 hours by a wet method in a ball mill, and then dried at 110° C. for 8 hours to obtain nano complex oxide doped dielectric ceramic materials, i.e, samples 4' to 10'.

Tests of the dielectric properties of samples 4' to 10'.

Each of samples 4' to 10' was pressed into a pellet with a diameter of 10 mm and sintered in a reducing atmosphere at the temperature range of 1150° C. to 1250° C. for 2 to 3 h, followed by reoxidizing in a weak oxidation atmosphere at 1050° C. for 3 h. Silver electrodes were deposited onto both the main sides of the pellet to conduct dielectric measurement. The dielectric properties and the average grain sizes of these samples are listed in Table 7.

TABLE 6

| Nano Dopant Sample | Composition (molar ratio) |
|---|---|
| ND2 | Y:Ce:Mn:Mg:Si:Ca = 4:1:3:12:5:2 |
| ND3 | Y:Ce:Mn:Mg:Si:Ca = 5:1:2.5:10:5:2.5 |
| ND4 | Y:Sm:Mn:Mg:Si:Ba = 3:1:4.5:10:4:3 |
| ND5 | Dy:Mn:Mg:Si:Ca = 1:4.5:11:6.5:2 |
| ND6 | Dy:Co:Mg:Si:B = 1:2.5:15:4:1 |
| ND7 | Er:Sm:Mn:Mg:Si:Ba = 1:3:5:14:3.5 |

TABLE 7

| Sample | Average particle size of $BaTiO_3$ (nm) | Nano dopant | Molar ratio of $BaTiO_3$:ND | Sintering condition | Dielectric constant ∈ (25° C.) | Average grain size of the sintered sample (nm) | Specs |
|---|---|---|---|---|---|---|---|
| 4' | 110 | ND2 | 95:5 | 1180° C.-3 h | 2070 | 147 | X7R |
| 5' | 125 | ND2 | 97:3 | 1200° C.-2 h | 2365 | 160 | X7R |
| 6' | 150 | ND3 | 97:3 | 1200° C.-2 h | 2299 | 175 | X7R |
| 7' | 125 | ND4 | 94:6 | 1200° C.-2 h | 2135 | 154 | X7R |
| 8' | 110 | ND5 | 96:4 | 1200° C.-2 h | 2203 | 152 | X7R |
| 9' | 125 | ND6 | 96:4 | 1170° C.-3 h | 2011 | 149 | X7R |
| 10' | 125 | ND7 | 98:2 | 1220° C.-2 h | 2538 | 185 | X5R |

Example 8

Powders of $BaTiO_3$ (with an average grain size of 110 nm, 125 nm, respectively) and a nano dopant (ND4 or ND6) were mixed as shown in Table 8. The mixture was ground for 20 hours by a wet method in a ball mill, and then dried at 110° C. for 8 hours to obtain nano complex oxide doped dielectric ceramic materials, i.e, samples 11' to 14'.

Tests of the dielectric properties of samples 11' to 14'.

Each of samples 11' to 14' was pressed into a pellet and sintered in a reducing atmosphere by a two-step sintering process, wherein the temperature was increased to 1200° C. to 1250° C. and kept for 0 to 10 min, and then was quickly decreased to 950° C. to 1100° C. and kept for 2 to 8 h, followed by reoxidizing in a weak oxidation atmosphere at 900° C. to 1000° C. for 3 h. Silver electrodes were deposited onto both the main sides of the pellet to conduct dielectric measurement. The dielectric properties and the average grain sizes of these samples are listed in Table 8.

TABLE 8

| Sample | Average particle size of $BaTiO_3$ (nm) | Nano dopant | Molar ratio of $BaTiO_3$:ND | Sintering condition | Dielectric constant ∈ (25° C.) | Average grain size of the sintered sample (nm) | Specs |
|---|---|---|---|---|---|---|---|
| 11' | 110 | ND4 | 95:5 | 1200° C.-0 min, 1050° C.-2 h | 2107 | 147 | X7R |

TABLE 8-continued

| Sample | Average particle size of BaTiO$_3$ (nm) | Nano dopant | Molar ratio of BaTiO$_3$:ND | Sintering condition | Dielectric constant ∈ (25° C.) | Average grain size of the sintered sample (nm) | Specs |
|---|---|---|---|---|---|---|---|
| 12' | 125 | ND6 | 97:3 | 1220° C.-0 min, 1080° C.-2 h | 2515 | 174 | X5R |
| 13' | 110 | ND4 | 97:3 | 1220° C.-10 min, 950° C.-8 h | 2047 | 152 | X7R |
| 14' | 110 | ND6 | 97:3 | 1220° C.-10 min, 950° C.-8 h | 2123 | 157 | X5R |

In the examples, nano-grained BaTiO$_3$-based dielectric materials for base-metal internal electrode multilayer ceramic capacitors with X5R/X7R characteristic were produced. The room-temperature dielectric constants of the samples (pellet samples) after two-step sintering or normal sintering at 950° C. to 1250° C. in a reducing atmosphere were 2000 to 2600 and the temperature coefficients of capacitance (TCC) were within ±15%. The dielectric losses of the sintered samples were less than 2.5%. The sintered samples had high insulation resistances in the range of 10$^{12}$ Ω·cm to 10$^{13}$ Ω·cm and their breakdown fields were more than 5 kV/mm. The average grain sizes of the sintered samples were 100 nm to 200 nm and the grains were very uniform.

Base-metal internal electrode multilayer ceramic capacitors (MLCC) were manufactured using the nano complex oxide doped dielectric ceramic material for the dielectric layer, which was sintered at 950-1200° C. The room-temperature dielectric constants of the MLCCs were 3000 to 3600 satisfying the X5R characteristic. The average grain sizes of the dielectric layers were less than 300 nm.

The nano complex oxide doped dielectric ceramic material of the present invention is useful as dielectric material for multilayer ceramic capacitor with ultra-thin dielectric layer (thickness less than 3 μm) and base-metal internal electrodes.

What we claim is:

1. A preparation process of a nano complex oxide doped dielectric ceramic material used for a multilayer ceramic capacitor, wherein said doped dielectric ceramic material comprises barium titanate and a nano complex oxide dopant, a molar ratio of the barium titanate to the nano complex oxide dopant is in the range of (90 to 98):(2 to 10), an average particle size of the barium titanate is in a range of 50 nm to 300 nm and the nano complex oxide dopant has the following formula (1):

$$wA+xB+yC+zD \quad (1)$$

wherein,
A represents one or more selected from the group consisting of CaTiO$_3$, CaO, BaO, SrO and MgO;
B represents one or more selected from the group consisting of MnO$_2$, CO$_2$O$_3$, CO$_3$O$_4$, Fe$_2$O$_3$ and Y$_2$O$_3$;
C represents one or more selected from the group consisting of SiO$_2$, B$_2$O$_3$ and Li$_2$O;
D represents an oxide of Re, wherein Re is one or more rare-earth elements selected from the group consisting of La, Ce, Pr, Nd, Sm, Eu, Gd, Tb, Dy, Ho, Er, Tm, Yb and Lu; and
w, x, y and z are molar percentages of the oxides with respect to the barium titanate, wherein w is 0.01% to 2%, x is 0.01% to 3%, y is 0.1% to 6%, and z is 0% to 4%, and said preparation process is a chemical coating process comprising the following steps:

(1) adding barium titanate powders into a solvent selected from the group consisting of de-ionized water, ethanol, propanol and isopropanol and milling to obtain a dispersed suspension of barium titanate, wherein the average particle size of the barium titanate powders is in the range of 50 nm to 300 nm;
(2) dissolving acetates or nitrates of metal elements corresponding to the oxides in the nano complex oxide dopant in de-ionized water to obtain a transparent solution S1;
(3) mixing alkoxide of silicon, ethanol, acetic acid and de-ionized water by continuous stirring to get a transparent solution S2;
(4) adding solution S1 and solution S2 into the suspension of barium titanate with stirring to obtain a slurry, wherein volume ratios of the solutions and the suspension are set as S1:S2:BaTiO$_3$ suspension=(1 to 8):(1 to 4):(10 to 50);
(5) adding ammonia water into the slurry obtained in step (4) to adjust the pH value to 6 to 11 so that the doping elements are uniformly coated onto the barium titanate particles through co-precipitation;
(6) drying the slurry obtained in step (5) at 80° C. to 120° C. to get dried powders;
(7) calcining the dried powders obtained in step (6) at 300° C. to 600° C. for 1 hour to 6 hours, followed by crushing and sieving;
wherein the nano complex oxide doped dielectric ceramic material thus obtained has a coating layer formed by the doping elements on the barium titanate particle, and the thickness of the coating layer is 1 nm to 20 nm.

2. The preparation process according to claim 1, wherein in step (1) of the chemical coating process the average particle size of the barium titanate is 100 nm, to 200 nm, and in step (3) volume ratios of the alkoxide of silicon, the ethanol, the acetic acid and the de-ionized water are set as alkoxide of silicon:ethanol:acetic acid:de-ionized water=1:(1 to 15):(1 to 8):(5 to 40) and the alkoxide of silicon is ethyl orthosilicate or butyl orthosilicate.

3. A preparation process of a nano complex oxide doped dielectric ceramic material used for a multilayer ceramic capacitor, wherein said doped dielectric ceramic material comprises barium titanate and a nano complex oxide dopant, a molar ratio of the barium titanate to the nano complex oxide dopant is in the range of (90 to 98):(2 to 10), an average particle size of the barium titanate is in a range of 50 nm to 300 nm and the nano complex oxide dopant has the following formula (1):

$$wA+xB+yC+zD \quad (1)$$

wherein,
A represents one or more selected from the group consisting of CaTiO$_3$, CaO, BaO, SrO and MgO;
B represents one or more selected from the group consisting of MnO$_2$, CO$_2$O$_3$, CO$_3$O$_4$, Fe$_2$O$_3$ and Y$_2$O$_3$;

C represents one or more selected from the group consisting of $SiO_2$, $B_2O_3$ and $Li_2O$;

D represents an oxide of Re, wherein Re is one or more rare-earth elements selected from the group consisting of La, Ce, Pr, Nd, Sm, Eu, Gd, Tb, Dy, Ho, Er, Tm, Yb and Lu;

w, x, y and z are molar percentages of the oxides with respect to the barium titanate, wherein w is 0.01% to 2%, x is 0.01% to 3%, y is 0.1% to 6%, and z is 0% to 4%, and in said preparation process, a nano complex oxide dopant is prepared by a sol-gel method firstly and then the nano complex oxide dopant is mixed with powders of $BaTiO_3$ having an average particle size in the range of 50 nm to 300 nm by a molar ratio of $BaTiO_3$ to the complex oxide as (90 to 98):(2 to 10), milled and then dried to obtain the nano complex oxide doped dielectric ceramic material, said sol-gel method comprises the following steps:

(1) dissolving acetates or nitrates of metal elements corresponding to the oxides in the complex oxide dopant in de-ionized water, and then adding polyethylene glycol (PEG) into the solution with continuous stirring till a transparent solution S1 is obtained, wherein the weight ratio of PEG and the metal acetates or nitrates is set as PEG:acetates or nitrates=(0.1 to 3):1;

(2) mixing alkoxide of silicon, ethanol, acetic acid and de-ionized water by continuous stirring to get a transparent solution S2;

(3) adding solution S1 into solution S2 with continuous stirring to obtain a transparent precursor solution (sol), wherein a volume ratio of solution S1 to solution S2 is set as S1:S2=(0.5 to 20):1;

(4) drying the sol obtained in step (3) at 80° C. to 160° C. for 6 hours to 48 hours to get a xerogel;

(5) calcining the xerogel at 400° C. to 1000° C. for 1 hour to 10 hours in air, followed by crushing and sieving to obtain a nano complex oxide dopant with an average particle size of 5 nm to 100 nm.

4. The preparation process according to claim 3, wherein the average particle size of the barium titanate is 100 nm to 200 nm, in step (2) of the sol-gel method, wherein volume ratios of the alkoxide of silicon, the ethanol, the acetic acid and the de-ionized water are set as alkoxide of silicon:ethanol:acetic acid:de-ionized water=1:(1 to 15):(1 to 8):(5 to 40) and the alkoxide of silicon is ethyl orthosilicate or butyl orthosilicate, and the obtained nano complex oxide dopant has an average particle size of 10 nm to 80 nm.

5. A process for manufacturing an ultrafine grained and temperature-stable multilayer ceramic capacitor, comprising the following steps:

a nano complex oxide doped dielectric ceramic material prepared by the process according to claim 1 is mixed with an organic solvent, a binder, a dispersant and a plasticizer to provide a ceramic slurry;

a dielectric layer is formed by a tape-casting method using the slurry with the thickness of the dielectric layer of below 10 μm;

multiple of the dielectric layers and a plurality of base-metal internal electrode layers are alternately stacked to prepare a stack body;

the binder is removed after the stack body is formed;

the binder-removed stack body is then sintered under a reducing atmosphere at a temperature of from 950° C. to 1250° C.;

the sintered stack body is reoxidized in an oxidation atmosphere at 800° C. to 1100° C. to enhance insulation resistance of the dielectric;

the sintered stack body is cooled down to room temperature; and a Cu or Ag terminal electrode is mounted to the cooled sintered stack body to obtain an ultrafine-grained and temperature-stable multilayer ceramic capacitor having base-metal internal electrodes, wherein the capacitor satisfies X5R or X7R standards, and the average grain size of the dielectric layers is less than 200 nm.

6. The process for manufacturing an ultrafine grained and temperature-stable multilayer ceramic capacitor according to claim 5, wherein the sintering process is carried out in one of two ways: (a) two-step sintering, the stack body is held at a relative high temperature $T_1$ for 0 min to 30 min, then the temperature is decreased to a relative low temperature $T_2$ and held for 2 hours to 10 hours, wherein $950° C. \leq T_2 < T_1 \leq 1250° C.$; or (b) normal sintering, the stack body is held at 1050° C. to 1250° C. for 2 hours to 10 hours.

7. The process for manufacturing an ultrafine grained and temperature-stable multilayer ceramic capacitor according to claim 5, wherein in step (1) the organic solvent is toluene or ethanol, the binder is polyvinyl-butyral, the dispersant is a phosphate and the plasticizer is di-n-butyl phthalate or di-sec-octyl phthalate.

8. A process for manufacturing an ultrafine grained and temperature-stable multilayer ceramic capacitor, comprising the following steps:

(1) a nano complex oxide doped dielectric ceramic material prepared by the process according to claim 1 is mixed with an organic solvent, a binder, a dispersant and a plasticizer to provide a ceramic slurry, wherein weight ratios of the nano complex oxide doped dielectric ceramic material, the organic solvent, the binder, the dispersant and the plasticizer are set as nano complex oxide doped dielectric ceramic material:organic solvent:binder:dispersant:plasticizer=(10 to 60):(3 to 15):(1 to 5):(1 to 10):(1 to 3);

(2) a dielectric layer is formed by tape-casting method from the slurry with the thickness of the dielectric layer of below 10 μm;

(3) multiple of the dielectric layers and a plurality of base-metal internal electrode layers are alternately stacked to prepare a stack body;

(4) the stack body fabricated in step (3) is subjected to a binder removing process at a temperature in the range of from 280° C. to 350° C. for 10 hours to 20 hours in air or under nitrogen atmosphere;

(5) the binder-removed stack body is sintered under a reducing atmosphere having oxygen partial pressure in an order of $10^{-6}$ atm to $10^{-12}$ atm and a volume ratio of $N_2$ to $H_2$ in the range of 40:1 to 15:1 through a two-step sintering or a normal sintering at 950° C. to 1250° C.;

(6) the sintered stack body is reoxidized in a weak oxidation atmosphere with oxygen partial pressure of $10^{-5}$ atm to $10^{-2}$ atm at 800° C. to 1100° C. for 2 hours to 10 hours;

(7) the sintered stack body is cooled down to room temperature; and (8) a Cu or Ag terminal electrode is mounted to the cooled sintered stack body and heated at 600° C. to 800° C. under $N_2$ atmosphere to obtain an ultrafine-grained and temperature-stable multilayer ceramic capacitor having base-metal internal electrodes, wherein the capacitor satisfies X5R or X7R standards, and the average grain size of the dielectric layers is less than 200 nm.

9. The process for manufacturing an ultrafine grained and temperature-stable multilayer ceramic capacitor according to claim 8, wherein in step (1) the organic solvent is toluene or ethanol, the binder is polyvinyl-butyral, the dispersant is a phosphate and the plasticizer is di-n-butyl phthalate or di-sec-octyl phthalate.

10. A Process for manufacturing an ultrafine grained and temperature-stable multilayer ceramic capacitor, comprising the following steps:
   a nano complex oxide doped dielectric ceramic material prepared by the process according to claim 3 is mixed with an organic solvent a binder, a dispersant and a plasticizer to provide a ceramic slurry;
   a dielectric layer is formed by a tape-casting method using the slurry with the thickness of the dielectric layer of below 10 µm;
   multiple of the dielectric layers and a plurality of base-metal internal electrode layers are alternately stacked to prepare a stack body;
   the binder is removed after the stack body is formed;
   the binder-removed stack body is then sintered under a reducing atmosphere at a temperature of from 950° C. to 1250° C.;
   the sintered stack body is reoxidized in an oxidation atmosphere at 800° C. to 1100° C. to enhance insulation resistance of the dielectric;
   the sintered stack body is cooled down to room temperature; and
   a Cu or Ag terminal electrode is mounted to the cooled sintered stack body to obtain an ultrafine-grained and temperature-stable multilayer ceramic capacitor having base-metal internal electrodes, wherein the capacitor satisfies X5R or X7R standards, and the average grain size of the dielectric layers is less than 200 nm.

11. The process for manufacturing an ultrafine grained and temperature-stable multilayer ceramic capacitor according to claim 10, wherein the sintering process is carried out in one of two ways: (a) two-step sintering, the stack body is held at a relative high temperature $T_1$ for 0 min to 30 min, then the temperature is decreased quickly to a relative low temperature $T_2$ and held for 2 to 10 hours, wherein $950°\text{ C.} \leq T_2 < T_1 \leq 1250°\text{ C.}$; or (b) normal sintering, the stack body is held at 1050° C. to 1250° C. for 2 to 10 hours.

12. The process for manufacturing an ultrafine grained and temperature-stable multilayer ceramic capacitor according to claim 10, wherein in step (1) the organic solvent is toluene or ethanol, the binder is polyvinyl-butyral, the dispersant is a phosphate and the plasticizer is di-n-butyl phthalate or di-sec-octyl phthalate.

13. A process for manufacturing an ultrafine grained and temperature-stable multilayer ceramic capacitor, comprising the following steps:
   (1) a nano complex oxide doped dielectric ceramic material prepared by the process according to claim 3 is mixed with an organic solvent, a binder, a dispersant and a plasticizer to provide a ceramic slurry, wherein weight ratios of the nano complex oxide doped dielectric ceramic material, the organic solvent, the binder, the dispersant and the plasticizer are set as nano complex oxide doped dielectric ceramic material powder:organic solvent:binder:dispersant:plasticizer=(10 to 60):(3 to 15):(1 to 5):(1 to 10):(1 to 3);
   (2) a dielectric layer is formed by tape-casting method from the slurry with the thickness of the dielectric layer of below 10 µm;
   (3) multiple of the dielectric layers and a plurality of base-metal internal electrode layers are alternately stacked to prepare a stack body;
   (4) the stack body fabricated in step (3) is subjected to a binder removing process at a temperature in the range of from 280° C. to 350° C. for 10 hours to 20 hours in air or under nitrogen atmosphere;
   (5) the binder-removed stack body is sintered under a reducing atmosphere having oxygen partial pressure in an order of $10^{-6}$ atm to $10^{-12}$ atm and a volume ratio of $N_2$ to $H_2$ in the range of 40:1 to 15:1 through a two-step sintering or a normal sintering at 950° C. to 1250° C.;
   (6) the sintered stack body is reoxidized in an oxidation atmosphere with oxygen partial pressure of $10^{-5}$ atm to $10^{-2}$ atm at 800° C. to 1100° C. for 2 hours to 10 hours;
   (7) the sintered stack body is cooled down to room temperature; and
   (8) a Cu or Ag terminal electrode is mounted to the cooled sintered stack body and heated at 600° C. to 800° C. under $N_2$ atmosphere to obtain an ultrafine-grained and temperature-stable multilayer ceramic capacitor having base-metal internal electrodes, wherein the capacitor satisfies X5R or X7R standards, and the average grain size of the dielectric layers is less than 200 nm.

14. The process for manufacturing an ultrafine grained and temperature-stable multilayer ceramic capacitor according to claim 13, wherein in step (1) the organic solvent is toluene or ethanol, the binder is polyvinyl-butyral, the dispersant is a phosphate and the plasticizer is di-n-butyl phthalate or di-sec-octyl phthalate.

* * * * *